United States Patent
Gu et al.

(10) Patent No.: US 10,468,696 B2
(45) Date of Patent: Nov. 5, 2019

(54) END CELL HEATER FOR FUEL CELL, AND FUEL CELL INCLUDING SAME

(71) Applicants: Hyundai Motor Company, Seoul (KR); Kia Motors Corporation, Seoul (KR); Hanon Systems, Daejeon (KR)

(72) Inventors: Jung Sam Gu, Daejeon (KR); Hyun Kun Shin, Daejeon (KR); Kwang Hun Oh, Daejeon (KR); Young-Ha Jeon, Daejeon (KR); Ju Han Kim, Gyeonggi-do (KR)

(73) Assignees: Hyundai Motor Company, Seoul (KR); Kia Motors Corporation, Seoul (KR); Hanon Systems, Daejeon (KR)

( * ) Notice: Subject to any disclaimer, the term of this patent is extended or adjusted under 35 U.S.C. 154(b) by 109 days.

(21) Appl. No.: 15/515,660

(22) PCT Filed: Jan. 22, 2016

(86) PCT No.: PCT/KR2016/000699
§ 371 (c)(1),
(2) Date: Mar. 30, 2017

(87) PCT Pub. No.: WO2016/126032
PCT Pub. Date: Aug. 11, 2016

(65) Prior Publication Data
US 2017/0331126 A1 Nov. 16, 2017

(30) Foreign Application Priority Data
Feb. 5, 2015 (KR) .................. 10-2015-0017889

(51) Int. Cl.
*H01M 8/0267* (2016.01)
*H01M 8/04223* (2016.01)
(Continued)

(52) U.S. Cl.
CPC ..... *H01M 8/04268* (2013.01); *H01M 8/0258* (2013.01); *H01M 8/0267* (2013.01);
(Continued)

(58) Field of Classification Search
None
See application file for complete search history.

(56) References Cited

U.S. PATENT DOCUMENTS

2003/0022046 A1*  1/2003  Hayashi .............. H01M 8/0228
                                                         429/435
2005/0058865 A1*  3/2005  Thompson .......... H01M 8/0258
                                                         429/429
(Continued)

FOREIGN PATENT DOCUMENTS

CN  101091277 A  12/2007
JP  2007-213883 A  8/2007
(Continued)

*Primary Examiner* — Lucas J. O'Donnell
(74) *Attorney, Agent, or Firm* — Mintz Levin Cohn Ferris Glovsky and Popeo, P.C.; Peter F. Corless

(57) ABSTRACT

A fuel cell includes end cell heaters each disposed on outer sides of end cells disposed at both ends of the fuel cell stack. The end cell heaters each include a support formed in a plate shape having fuel channels and air channels. A heat generating part is formed in the support. Electricity conduction blocks are coupled to the support.

11 Claims, 7 Drawing Sheets

(51) Int. Cl.
*H01M 8/2457* (2016.01)
*H01M 8/0258* (2016.01)
*H01M 8/04007* (2016.01)
*H01M 8/242* (2016.01)
*H01M 8/2465* (2016.01)
*H01M 8/2483* (2016.01)

(52) U.S. Cl.
CPC ... *H01M 8/04037* (2013.01); *H01M 8/04067* (2013.01); *H01M 8/04253* (2013.01); *H01M 8/242* (2013.01); *H01M 8/2457* (2016.02); *H01M 8/2465* (2013.01); *H01M 8/2483* (2016.02)

(56) References Cited

U.S. PATENT DOCUMENTS

| | | |
|---|---|---|
| 2008/0050627 A1 | 2/2008 | Winter et al. |
| 2015/0090427 A1* | 4/2015 | Brandauer .......... H01M 10/625 165/64 |

FOREIGN PATENT DOCUMENTS

| | | |
|---|---|---|
| JP | 2007213883 A | 8/2007 |
| JP | 2009-193791 A | 8/2009 |
| JP | 2009193791 A | 8/2009 |
| KR | 10-2007-0093440 A | 9/2007 |
| KR | 20070093440 A | 9/2007 |

\* cited by examiner

US 10,468,696 B2

END CELL HEATER FOR FUEL CELL, AND FUEL CELL INCLUDING SAME

CROSS-REFERENCE TO RELATED PATENT APPLICATIONS

This patent application is a United States national phase patent application based on PCT/KR2016/000699, filed on Jan. 22, 2016, which claims the benefit of Korean Patent Application No. 10-2015-0017889, filed on Feb. 5, 2015, the disclosures of which are hereby incorporated herein by reference in their entirety.

TECHNICAL FIELD

The present invention relates to an end cell heater for a fuel cell and a fuel cell including the same, and more particularly, to an end cell heater for a fuel cell each disposed on outer sides of end cells disposed at both ends of a fuel cell stack and capable of preventing water existing in the end cells of the fuel cell stack from being frozen to improve initial start ability of the fuel cell at the time of cold-starting the fuel cell during winter, and a fuel cell including the same.

BACKGROUND

Generally, a fuel cell, which is a power generation device converting chemical energy by oxidation and reduction of hydrogen into electric energy, discharges only water ($H_2O$) as a byproduct, does not substantially generate NOx, SOx, and dust, generates a low amount of $CO_2$, and does not substantially generate noise unlike existing other chemical energy. Therefore, the fuel cell has been prominent as the next-generation alternative energy.

The fuel cell includes unit cells basically including an electrolyte plate containing an electrolyte, an anode, a cathode, a separator separating the electrolyte plate containing the electrolyte, the anode, and the cathode from one another, and the like. However, since the unit cell generally generates a low voltage of 0.6 to 0.8V, a fuel cell stack 1 in which several tens or several hundreds of unit cells 30 are stacked is configured to obtain a desired electric output, as illustrated in FIG. 1. In addition, a membrane-electrode assembly (MEA) is configured by forming the electrolyte plate containing the electrolyte, the anode, and the cathode integrally with one another, and patterns are formed in the separator separating the electrolyte plate containing the electrolyte, the anode, and the cathode from one another to allow a fuel and air to flow.

In addition, various fuels such as natural gas, petroleum, coal gas, methanol, and the like, may be used in the fuel cell, and are converted into hydrogen through a fuel reforming device and are used.

However, in the fuel cell configured in a form of the fuel cell stack as described above, water generated by a bond between oxygen and hydrogen in unit cells (end cells) positioned at the outermost portions in a stack direction of the unit cells remains, and is frozen in the end cells due to a cold external temperature during winter. Therefore, electricity is not generated in the end cells, such that initial start ability and oscillation ability of the fuel cell are deteriorated.

SUMMARY OF THE DISCLOSURE

An object of the present invention is to provide an end cell heater for a fuel cell each disposed on outer sides of end cells disposed at both ends of a fuel cell stack and capable of preventing water existing in the end cells of the fuel cell stack from being frozen to improve initial start ability of the fuel cell at the time of cold-starting the fuel cell during winter, and a fuel cell including the same.

In one general aspect, an end cell heater 1000 for a fuel cell includes: a support 100 formed in a plate shape and having fuel channels 140 and air channels 150 each formed at both sides thereof so as to penetrate through both surfaces thereof; a heat generating part provided in the support 100 and generating heat; and electricity conduction blocks 600 coupled to the support 100 so as to penetrate through both surfaces of the support 100.

The support 100 may have space parts 110 and insertion holes 120 formed therein so as to penetrate through both surfaces thereof, the heat generating part may be formed of positive temperature coefficient (PTC) elements 200 and be disposed in the space parts 110, and the electricity conduction blocks 600 may be inserted into the insertion holes 120, and the end cell heater for a fuel cell may further include: a first electrode 300 and a second electrode 400 stacked on both surfaces of the support 100, respectively, to thereby be electrically connected to the PTC elements 200 and having the electricity conduction blocks 600 penetrating therethrough and insulated therefrom; a pair of insulators 500 stacked on outer sides of the first electrode 300 and the second electrode 400 and having through-holes 510 formed therein, the through-holes 510 having the electricity conduction blocks 600 penetrating therethrough; and a pair of electricity conduction plates 700 stacked on outer sides of the pair of insulators 500 to thereby be coupled to the electricity conduction blocks 600 and electrically connected to the electricity conduction blocks 600.

The support 100 may have seating grooves 130 concavely formed in both surfaces thereof, and the first electrode 300, the second electrode 400, and the pair of insulators 500, and the pair of electricity conduction plates 700 may be seated in the seating grooves 130, such that an outer surface of the support 100 and outer surfaces of the electricity conduction plates 700 are coplanar with each other.

Fastening holes 610 may be formed in the electricity conduction blocks 600, and coupling holes 710 corresponding to the fastening holes 610 may be formed in the electricity conduction plates 700, such that the electricity conduction plates 700 are coupled to the electricity conduction blocks 600 by fastening means 800, and the fastening means 800 may be formed not to protrude outwardly of the outer surfaces of the electricity conduction plates 700.

The insertion holes 120 formed in the support 100 may be formed between or in the vicinity of the space parts 110 in which the PTC elements 200 are disposed.

The support 100 may have connector pins 170 protruding from both ends thereof, the connector pins 170 being formed to be electrically connected to the first electrode 300 and the second electrode 400.

Connection tabs 180 may be formed in the support 100 so as to be electrically connected to the connector pins 170, and the first electrode 300 and the second electrode 400 may be stacked on and closely adhere to both surfaces of the support 100, such that the connection tabs 180 are electrically connected to the first electrode 300 and the second electrode 400.

The support 100, the connector pins 170, and the connection tabs 180 may be formed integrally with one another.

In another general aspect, a fuel cell 2000 including an end cell heater for a fuel cell includes: a fuel cell stack 1100 formed by stacking unit cells and having fuel channels 1110 and air channels 1120 each formed at both sides thereof so as to penetrate through both surfaces thereof in a stack direction; and the end cell heater 1000 as described above coupled to the fuel cell stack 1100 and stacked on an outer side of a unit cell stacked at the outermost portion among the unit cells, such that channels are connected to each other.

The fuel cell may further include a bypass plate 1200 stacked on an outer side of the end cell heater 1000, having fuel channels 1210 and air channels 1220 formed at both sides thereof so as to be connected to the fuel channels 140 and the air channels 150 of the end cell heater 1000, respectively, and formed of an electrically conductive material.

The fuel cell may further include: an electrode plate 1300 stacked on an outer side of the bypass plate 1200, having electrode terminals 1310 protruding outwardly, and formed of an electrically conductive material; a cover 1400 coupled to the electrode plate 1300 so as to enclose an outer side of the electrode plate 1300, formed to expose the electrode terminal 1310 to the outside thereof, and formed of an electrical insulating material; and fastening members 1500 having both ends coupled to the cover 1400 so that the fuel cell stack 1100, the end cell heater 1000, the bypass plate 1200, the electrode plate 1300, and the cover 1400 closely adhere to one another in the stack direction.

In the end cell heater for a fuel cell and the fuel cell including the same according to the present invention, it is possible to prevent water in the end cells of the fuel cell stack from being frozen, such that initial start ability and oscillation ability of the fuel cell may be improved.

In addition, the end cell heaters are stacked in the same direction at the stack direction of the cells of the fuel cell stack, such that the end cell heaters may be easily coupled to the fuel cell stack. Therefore, a separate structure for coupling the end cell heaters to the fuel cell stack does not need to be formed.

DETAILED DESCRIPTION OF EXEMPLARY EMBODIMENTS OF THE INVENTION

Hereinafter, an end cell heater for a fuel cell and a fuel cell including the same according to the present invention having the configuration as described above will be described in detail with reference to the accompanying drawings.

Figure 4:
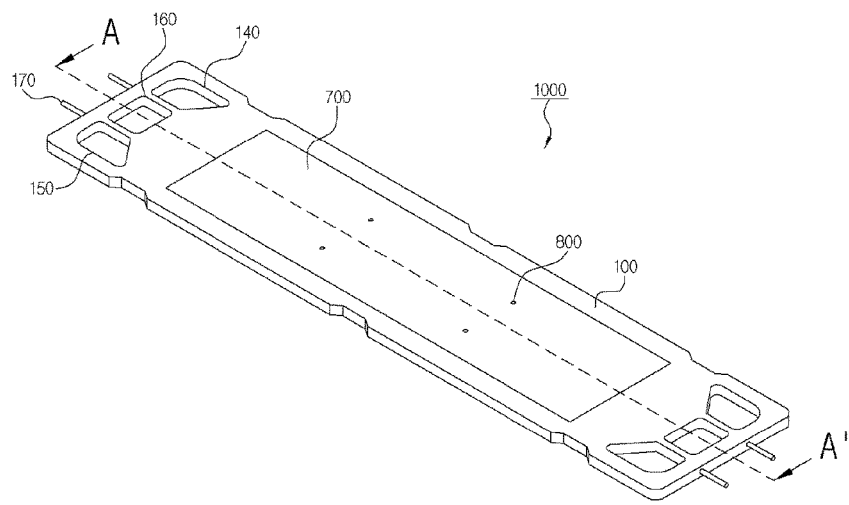
FIGS. 4 and 5 are, respectively, an assembled perspective view and an exploded perspective view illustrating an end cell heater according to an exemplary embodiment of the present invention.
Figure 5:
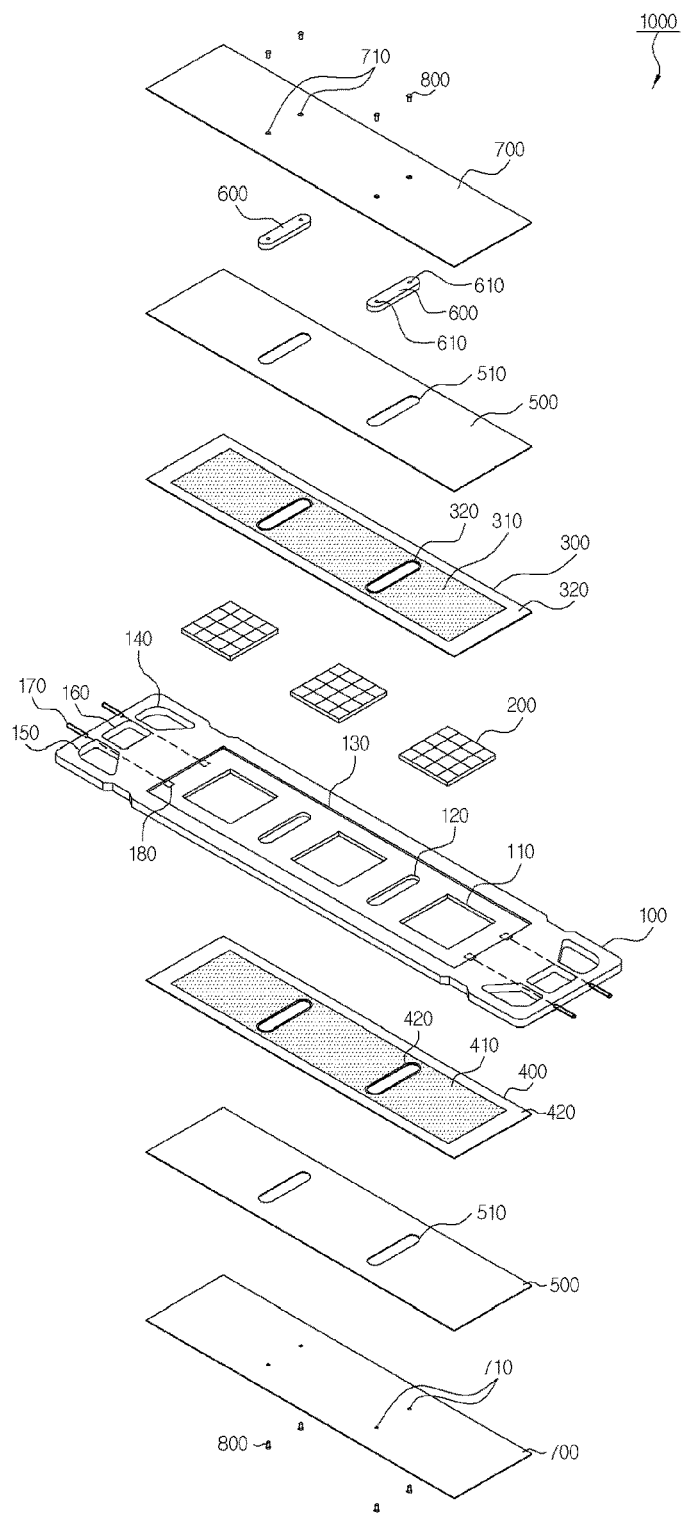
Figure 6:
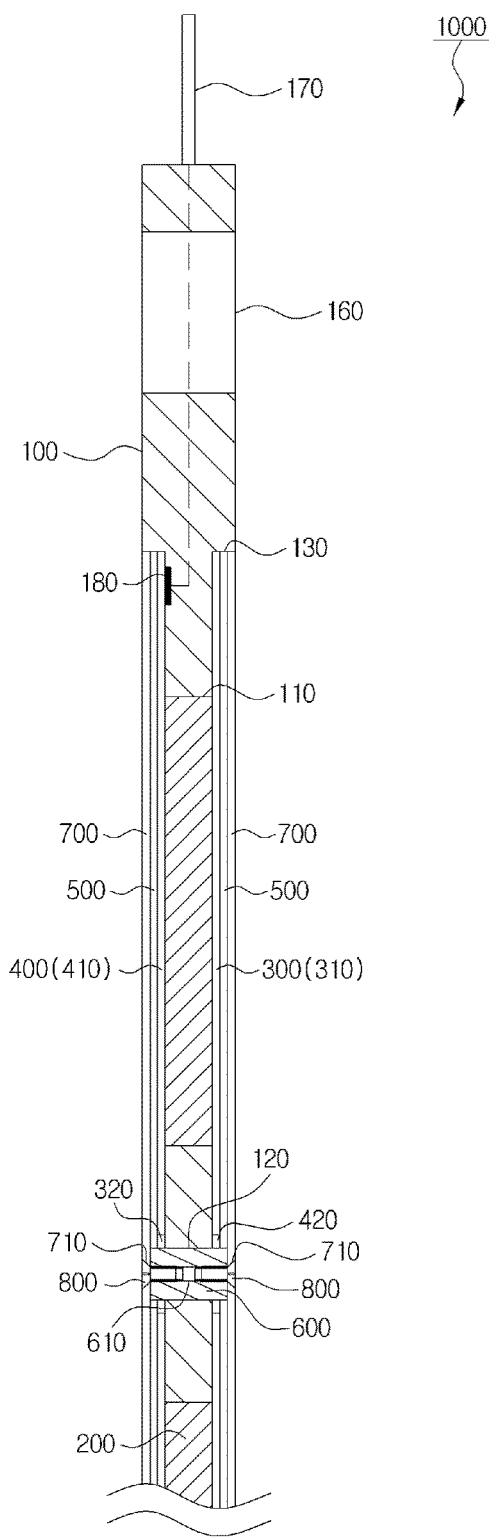
FIG. 6 is a cross-sectional view taken along line A-A' of FIG. 4.
Figure 7:
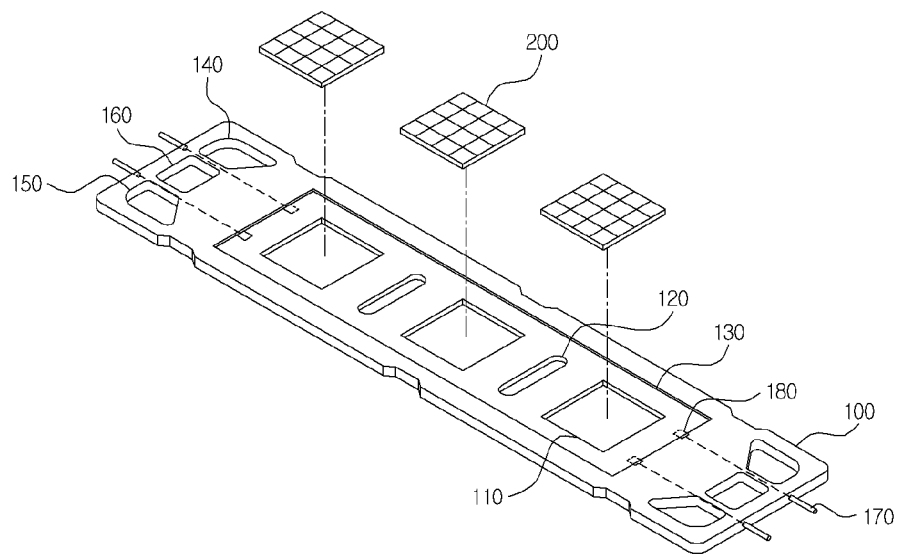
FIGS. 7 to 12 are perspective views illustrating processes of assembling an end cell heater according to the present invention.
Figure 8:
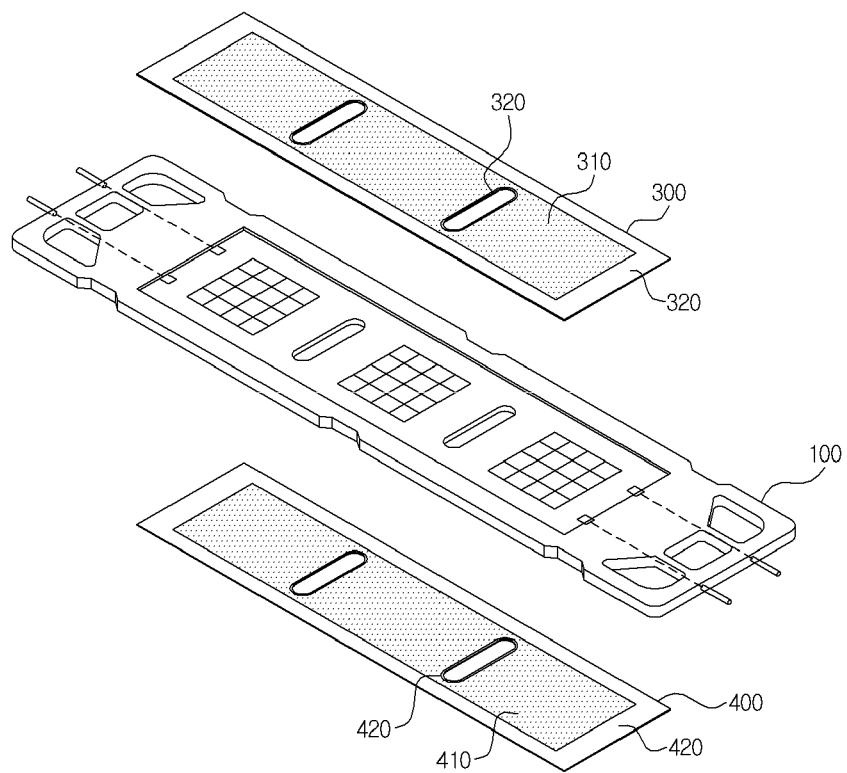
Figure 9:
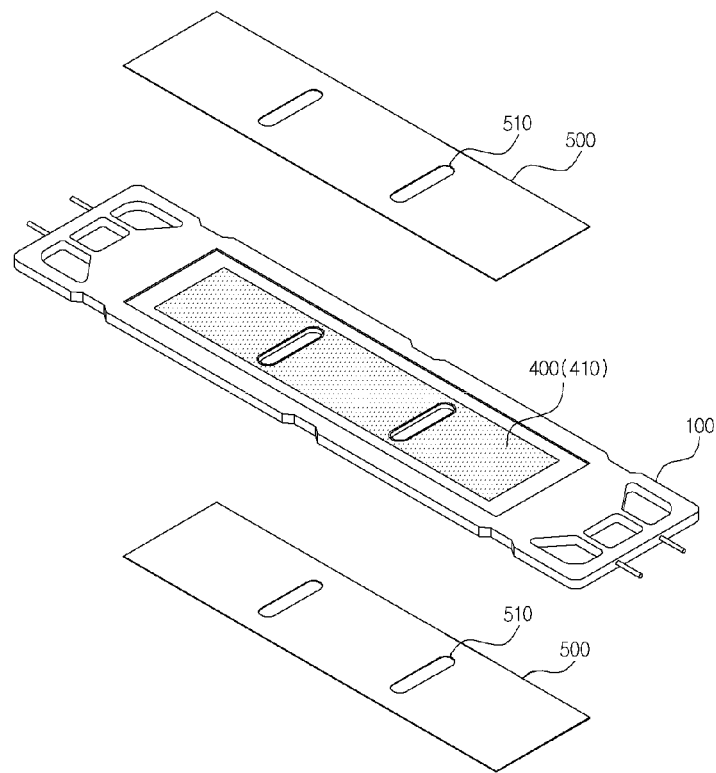
Figure 10:
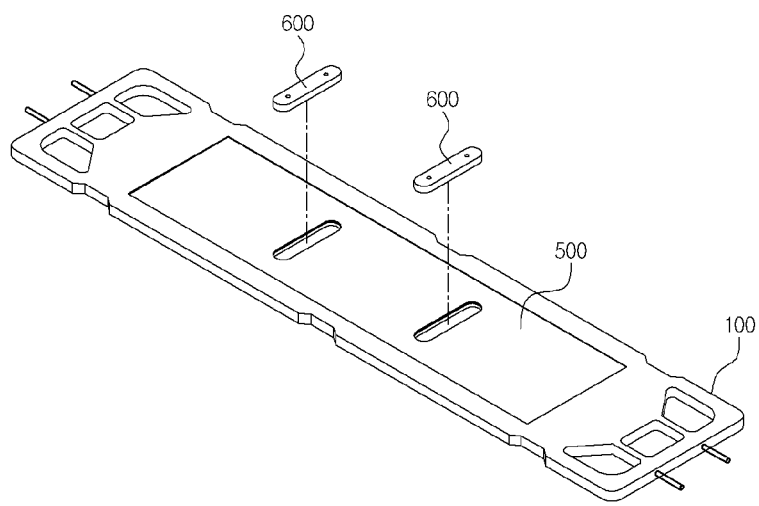
Figure 11:
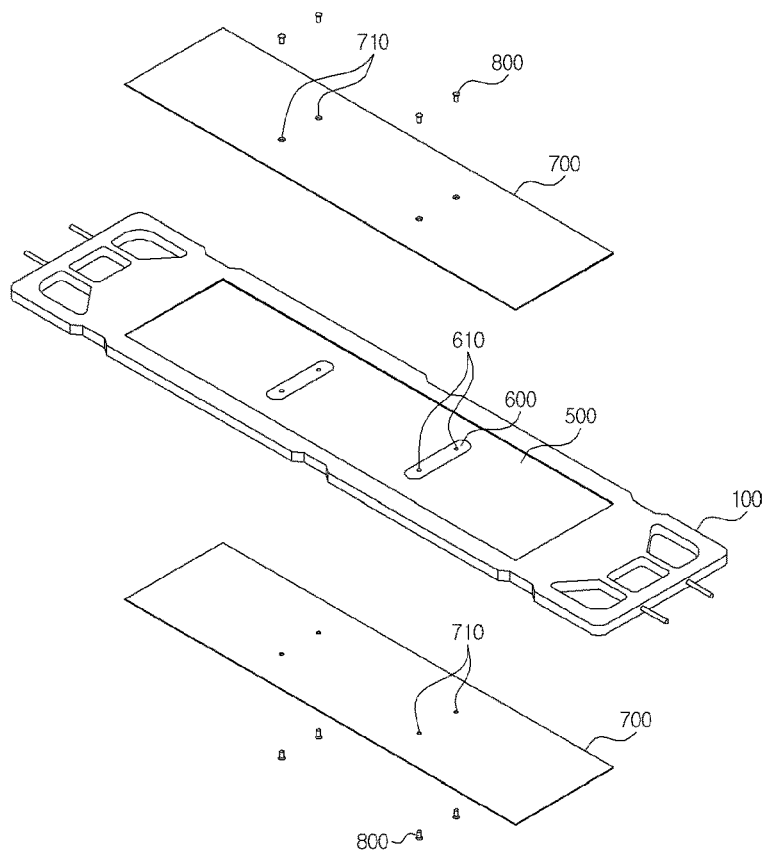
Figure 12:
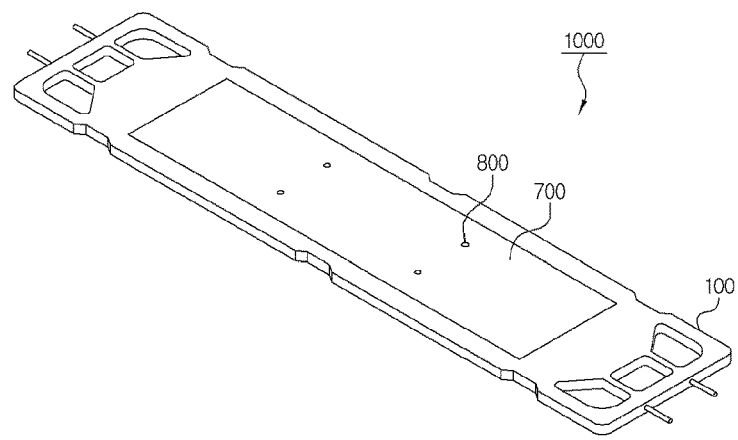

FIGS. 4 and 5 are, respectively, an assembled perspective view and an exploded perspective view illustrating an end cell heater 1000 according to an exemplary embodiment of the present invention, FIG. 6 is a cross-sectional view taken along line A-A' of FIG. 4, and FIGS. 7 to 12 are perspective views illustrating processes of assembling the end cell heater 1000 according to the present invention.

As illustrated, the end cell heater 1000 for a fuel cell according to the present invention may be configured to include a support 100 formed in a plate shape and having fuel channels 140 and air channels 150 each formed at both sides thereof so as to penetrate through both surfaces thereof; a heat generating part provided in the support 100 and generating heat; and electricity conduction blocks 600 coupled to the support 100 so as to penetrate through both surfaces of the support 100.

First, the support 100 may be formed in the plate shape so as to be stacked on and closely adhere to an end cell, which is a unit cell disposed at the outermost portion in a stack direction of unit cells in a fuel cell stack, and may be formed in a shape corresponding to an appearance of the unit cell. In addition, the support 100 has the fuel channels 140 and the air channels 150 formed in a thickness direction at both sides thereof in a length direction so as to penetrate through both surfaces thereof. In this case, cooling channels 160 may be formed between the fuel channels 140 and the air channels 150 so that a heat exchange medium for cooling the fuel cell stack may flow.

The heat generating part, which is a part generating heat, is provided in the support 100, and may be formed to be electrically insulated.

The electricity conduction blocks 600, which are parts formed of an electrically conductive material to allow electricity to be conducted to the fuel cell stack, may be coupled to the support 100 so as to penetrate through both surfaces of the support 100. That is, since the support 100 is formed of an electrical insulting material, the electricity conduction blocks 600 are provided so that electricity generated in the fuel cell stack is conducted.

Therefore, the end cell heater 1000 for a fuel cell according to the present invention may be stacked on and be coupled to the outer side of the end cell 1000, which is the unit cell disposed at the outermost portion of the fuel cell stack in the stack direction, in the same direction as the stack direction of the unit cells. Accordingly, a separate structure for coupling the end cell heater 1000 does not need to be formed, and the end cell heater 1000 may closely adhere to the end cell of the fuel cell stack to heat the fuel cell, thereby making it possible to prevent water in the end cell of the fuel cell stack from being frozen to improve initial start ability and oscillation ability of the fuel cell.

In addition, in the end cell heater 1000 described above, the support 100 has space parts 110 and insertion holes 120 formed therein so as to penetrate through both surfaces thereof, the heat generating part is formed of positive temperature coefficient (PTC) elements 200 and is disposed in the space parts 110, and the electricity conduction blocks 600 are inserted into the insertion holes 120, and the end cell heater 1000 may be configured to further include a first electrode 300 and a second electrode 400 stacked on both surfaces of the support 100, respectively, to thereby be electrically connected to the PTC elements 200 and having the electricity conduction blocks 600 penetrating therethrough and insulated therefrom; a pair of insulators 500 stacked on outer sides of the first electrode 300 and the second electrode 400 and having through-holes 510 formed therein, the through-holes 510 having the electricity conduction blocks 600 penetrating therethrough; and a pair of electricity conduction plates 700 stacked on outer sides of the pair of insulators 500 to thereby be coupled to the electricity conduction blocks 600 and electrically connected to the electricity conduction blocks 600.

First, the support 100 has the space parts 110 and the insertion holes 120 formed therein so as to penetrate through both surfaces thereof. That is, the space parts 110 and the insertion holes 120 may be formed in the thickness direction of the support 100 so as to penetrate through the support 100, and the numbers of space parts 110 and insertion holes 120 may be plural. Hereinafter, an example in which the numbers of space parts 110 and insertion holes 120 are plural will be described.

In addition, the heat generating part is formed of the PTC elements 200 and is disposed in the space parts 110, and the electricity conduction blocks 600 may be inserted into the insertion holes 120. That is, the PTC elements 200 may be inserted, respectively, into the plurality of space parts 110 formed to be spaced apart from one another in the length direction of the support 100, and the electricity conduction blocks 600 may be each inserted into and coupled to the plurality of insertion holes 120, respectively.

In this case, the end cell heater 1000 according to the present invention may be configured to further include the first electrode 300, the second electrode 400, the insulators 500, and the electricity conduction plates 700.

That is, in a state in which the PTC elements 200 are inserted into the space parts 110 of the support 100 and the electricity conduction blocks 600 are inserted into the insertion holes 200 of the support 100, the first electrode 300 corresponding to a positive electrode may be stacked on an upper surface of the support 100 and the second electrode 300 corresponding to a negative electrode may be stacked on a lower surface of the support 100, such that the PTC elements 200 may be fixed, insulation parts 320 and 420 may be formed in the first and second electrodes 300 and 400, respectively, so that the electricity conduction blocks 600 penetrate through the first and second electrodes 300 and 400 and are electrically insulated from the first and second electrodes 300 and 400, and connection parts 310 and 410 may be formed in the first and second electrodes 300 and 400, respectively, so that the first and second electrodes 300 and 400 are electrically connected to the PTC elements 200. In addition, the insulators 500 are stacked on an upper side of the first electrode 300 and a lower side of the second electrode 400, respectively, for the purpose of insulation. In addition, the electricity conduction plates 700 are stacked on an upper side of an upper insulator 500 and a lower side of a lower insulator 500 corresponding to outer sides of the insulators 500, respectively, and are formed of an electrically conductive material and are coupled to the electricity conduction blocks 600 to allow electricity to pass through both surfaces of the support 100 and be conducted.

Therefore, the electricity generated in the fuel cell stack and electricity supplied to the PTC elements 200 through the electrodes 300 and 400 may be insulated from each other, and external force is applied to the pair of electricity conduction plates 700 from outer sides of the pair of electricity conduction plates 700 to allow the pair of electricity conduction plates 700 to be compressed in the stack direction, such that the electricity conduction plates 700 may be coupled to the electricity conduction blocks 600, thereby making it possible to certainly electrically connect the electrodes 300 and 400 and the PTC elements 200 to each other.

In addition, the support 100 has seating grooves 130 concavely formed in both surfaces thereof, and the first electrode 300, the second electrode 400, and the pair of insulators 500, and the pair of electricity conduction plates 700 are seated in the seating grooves 130, such that an outer surface of the support 100 and outer surfaces of the electricity conduction plates 700 may be coplanar with each other.

That is, the seating grooves 130 are concavely formed in both surfaces of the support 100, the space parts 110 and the insertion holes 120 may be formed in a region in which the seating grooves 130 are formed, the first electrode 300, the second electrode 400, and the pair of insulators 500, and the pair of electricity conduction plates 700 are seated and stacked in the seating grooves 130, such that both surfaces of the support 100 and the outer surfaces of the electricity conduction plates 700 coincide with each other when the electricity conduction plates 700 are coupled to the electricity conduction blocks 600.

Therefore, when the end cell heater 1000 according to the present invention is stacked on the fuel cell stack, fuel channels and air channels corresponding to each other may be easily connected to each other, and the electricity conduction plates 700 may closely adhere to the end cell of the fuel cell stack, such that heat and electricity may be smoothly transferred.

In addition, fastening holes 610 are formed in the electricity conduction blocks 600, and coupling holes 710 corresponding to the fastening holes 610 are formed in the electricity conduction plates 700, such that the electricity conduction plates 700 are coupled to the electricity conduction blocks 600 by fastening means 800, and the fastening means 800 may be formed not to protrude outwardly of the outer surfaces of the electricity conduction plates 700.

That is, in the case in which the electricity conduction plates 700 are coupled to the electricity conduction blocks 600 using the fastening means 800, the electricity conduction plates 700 may be coupled to the electricity conduction blocks 600 by forming the fastening holes 610 formed of female screws in the electricity conduction blocks 600 and forming the coupling holes 710 in the electricity conduction plates 700 so as to penetrate through the electricity conduction plates 700. In this case, the fastening means 800 are formed of flat headed bolts, and the coupling holes 710 having a shape corresponding to that of head portions of the flat headed bolts are formed in the electricity conduction plates 700, such that the fastening means 800 may not protrude outwardly of the surfaces of the electricity conduction plates 700.

Therefore, the electricity conduction plates 700 may closely adhere to the end cell 1000 of the fuel cell stack.

In addition, the insertion holes 120 formed in the support 100 may be formed between or in the vicinity of the space parts 110 in which the PTC elements 200 are disposed.

That is, since the electricity conduction plates 700 may be coupled to the electricity conduction blocks 600 to closely adhere to the electricity conduction blocks 600 in the stack direction, the insertion holes 120 into which the electricity conduction blocks 600 are inserted may be formed between or in the vicinity of the space parts 110 into which the PTC elements 200 are inserted so that the electrodes 300 and 400 and the PTC elements 200 may closely adhere to each other.

In addition, the support 100 has connector pins 170 protruding from both ends thereof, the connector pins 170 being formed to be electrically connected to the first electrode 300 and the second electrode 400.

The connector pins 170 may be formed by protruding electrical connection parts each connected to the first electrode 300 and the second electrode 400 outwardly of the support 100. The connector pins 170 protrude from both ends of the support 100 in the length direction, and may be electrically connected to the first electrode 300 and the second electrode 400.

Here, in the case in which three PTC elements 200 are provided as illustrated, two connector pins 170 are formed at each of both sides (a total of four connector pins 170 are formed). Here, three connector pins 170 may be configured to be connected to the second electrode 400 corresponding to the negative electrode and one connector pin 170 may be configured to be connected to the first electrode 300 corresponding to the positive electrode. In this case, the second electrode 400 corresponding to the negative electrode may be formed of a circuit having a pattern form so as to be connected to the three connector pins 170.

In addition, connection tabs 180 are formed in the support 100 so as to be electrically connected to the connector pins 170, and the first electrode 300 and the second electrode 400 are stacked on and closely adhere to both surfaces of the support 100, such that the connection tabs 180 may be electrically connected to the first electrode 300 and the second electrode 400.

That is, since the first electrode 300 and the second electrode 400 are stacked on the support 100, the connection tabs 180 may be formed in the support 100 so that the first electrode 300 and the second electrode 400 may closely adhere to the support 100 through the stacking to thereby be electrically connected to the connector pins 170. In this case, the connection tabs 180 are formed on lower surfaces of inner sides of the seating grooves 130, such that the connection tabs 180 and the electrodes 300 and 400 may be easily electrically connected to each other when the first electrode 300 and the second electrode 400 are stacked to be seated in the seating grooves 130.

In addition, the support 100, the connector pins 170, and the connection tabs 180 may be formed integrally with one another.

That is, the connector pins 170 and the connection tabs 180 are formed integrally with each other in a form in which they are connected to each other, such that the support 100, the connector pins 170, and the connection tabs 180 may be formed integrally with one another through injection-molding.

Figure 1:
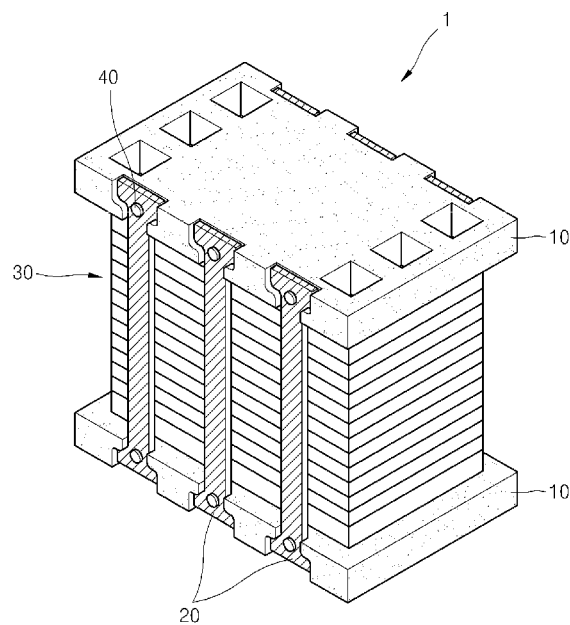
FIG. 1 is a perspective view illustrating a fuel cell according to the related art.
Figure 2:
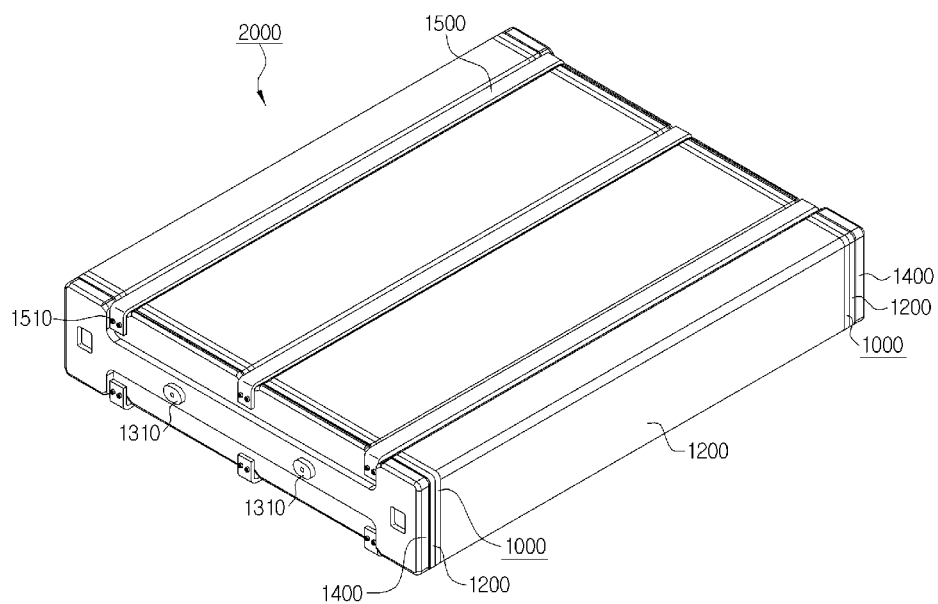
FIGS. 2 and 3 are, respectively, an assembled perspective view and an exploded perspective view illustrating a fuel cell including an end cell heater according to the present invention.
Figure 3:
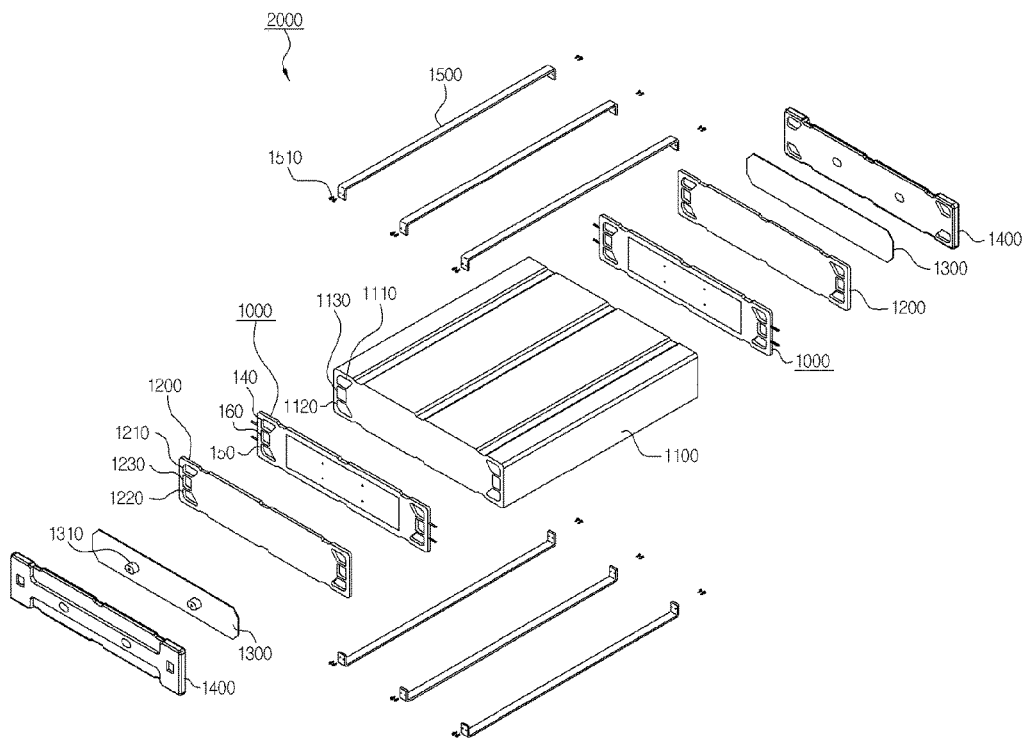

In addition, FIGS. 2 and 3 are, respectively, an assembled perspective view and an exploded perspective view illustrating a fuel cell including the end cell heater 1000 according to the present invention.

As illustrated, a fuel cell 2000 including the end cell heater 1000 for a fuel cell according to the present invention may be configured to include a fuel cell stack 1100 formed by stacking unit cells and having fuel channels 1110 and air channels 1120 each formed at both sides thereof so as to penetrate through both surfaces thereof in a stack direction; and the end cell heater 1000 coupled to the fuel cell stack 1100 and stacked on outer sides of unit cells stacked at the outermost portions among the unit cells, such that channels are connected to each other.

That is, the fuel cell 2000 may be formed by stacking the end cell heaters 1000 on the fuel cell stack 1100 formed by stacking the unit cells, and the end cell heaters 1000 may be stacked on and closely adhere to end cells, which are unit cells stacked at the outermost portions of the fuel cell stack 1100, in the same direction as the stack direction. In this case, the fuel channels 1100 and the air channels 1120 formed in the fuel cell stack 1100 may be connected to the fuel channels 140 and the air channels 150 of the end cell heaters 1000 so as to correspond to the fuel channels 140 and the air channels 150 of the end cell heaters 1000. In this case, cooling channels 1130 are formed between the fuel channels 1110 and the air channels 1120 in the fuel cell stack 1100, such that a heat exchange medium (a refrigerant) may pass through the unit cells to cool the unit cells.

Therefore, the end cell heaters 1000 may be installed on the fuel cell 1100 stack only by stacking the end cell heaters 1000 on outer sides of the end cells, similar to stacking the unit cells constituting the fuel cell stack 1100, and coupling the end cell heaters 1000 to the end cells so as to closely adhere to the end cells, and a separate structure for connecting the channels to each other is not required, such that the end cell heaters 1000 may be very easily installed. In addition, it is possible to prevent water in the end cells of the fuel cell stack 1100 from being frozen using the end cell heaters 1000 as described above, such that initial start ability and oscillation ability of the fuel cell 2000 may be improved.

In addition, the fuel cell 2000 may be configured to further include bypass plates 1200 stacked on outer sides of the end cell heaters 1000, having fuel channels 1210 and air channels 1220 formed at both sides thereof so as to be connected to the fuel channels 140 and the air channels 150 of the end cell heaters 1000, respectively, and formed of an electrically conductive material.

That is, the fuel channels 1210 and the air channels 1220 may be formed at both sides of the bypass plates 1200 having sufficient rigidity and formed of the electrically conductive material, and the end cell heaters 1000 may closely adhere entirely to the end cells using the bypass plates 1200. In this case, cooling channels 1230 may also be formed in the bypass plates 1200.

In addition, the fuel cell 2000 may be configured to further include electrode plates 1300 stacked on outer sides of the bypass plates 1200, having electrode terminals 1310 protruding outwardly, and formed of an electrically conductive material; covers 1400 coupled to the electrode plates 1300 so as to enclose outer sides of the electrode plates 1300, formed to expose the electrode terminals 1310 to the outside thereof, and formed of an electrical insulating material; and fastening members 1500 having both ends coupled to the covers 1400 so that the fuel cell stack 1100, the end cell heaters 1000, the bypass plates 1200, the electrode plates 1300, and the covers 1400 closely adhere to one another in the stack direction.

In the fuel cell, the fuel cell stack 1100, a pair of the end cell heaters 1000, a pair of the bypass plates 1200, a pair of the electrode plates 1300, and a pair of the covers 1400 are stacked, and both ends of the plurality of fastening members 1500 formed to be elongated in the stack direction are coupled and fixed to the covers 1400 by fastening means 1510 so that the fuel cell stack 1100, the pair of the end cell heaters 1000, the pair of the bypass plates 1200, the pair of the electrode plates 1300, and the pair of the covers 1400 may closely adhere and be fixed to each other in a state in which they are stacked.

In this case, the electrode plates 1300 may be formed at a length shorter than that of the bypass plates 1200 so as not to block the fuel channels 1110, the air channels 1120, the cooling channels 1130, and the like, the electrode terminals 1310 may be formed in the electrode plates 1300 so as to protrude in an outward direction so that electricity generated in the fuel cell stack 1100 may be transferred to the outside, the covers 1400 may enclose and insulate the electrode plates 1300, and portions of the covers 1400 corresponding to the electrode terminals 1310 may be formed in the covers 1400 so as to penetrate through the covers 1400 so that the electrode terminals 1310 may be exposed to the outside of the covers 1400. In addition, communication holes that may be connected to the cooling channels 1130 may be formed in the cover 1400 disposed at one side, and communication holes that may be connected to the fuel channels 1110 and the air channels 1120 may be formed in the cover 1400 disposed at the other side.

The present invention is not limited to the above-mentioned exemplary embodiments, but may be variously applied. In addition, the present invention may be variously modified by those skilled in the art to which the present invention pertains without departing from the gist of the present invention claimed in the claims.

DESCRIPTION OF MAIN ELEMENTS

1000: end cell heater for fuel cell
100: support
110: space part
120: insertion hole
130: seating groove
140: fuel channel
150: air channel
160: cooling channel
170: connector pin
180: connection tab
200: PTC elements (heat generating part)
300: first electrode
310: connection part
320: insulation part
400: second electrode
410: connection part
420: insulation part
500: insulator
510: through-hole
600: electricity conduction block
610: fastening hole
700: electricity conduction plate
710: coupling hole
800: fastening mean
2000: fuel cell
1100: fuel cell stack
1110: fuel channel
1120: air channel
1130: cooling channel
1200: bypass plate
1210: fuel channel
1220: air channel
1230: cooling channel
1300: electrode plate
1310: electrode terminal
1400: cover
1500: fastening member
1510: fastening mean

The invention claimed is:

1. An end cell heater for a fuel cell, comprising:
a support formed in a plate shape and having fuel channels and air channels each formed at opposing sides of a top surface thereof to penetrate through the support;
a heat generating part provided in the support and generating heat; and
electricity conduction blocks coupled to the support to penetrate through the support,
wherein the support has space parts and insertion holes are formed therein to penetrate through the support, the heat generating part is disposed in the space parts, and the electricity conduction blocks are inserted into the insertion holes.

2. The end cell heater for a fuel cell of claim 1, wherein the heat generating part is formed of positive temperature coefficient elements,
the end cell heater for a fuel cell further comprising:
a first electrode and a second electrode stacked on both of the surfaces of the support, respectively, to thereby be electrically connected to the positive temperature coefficient elements and having the electricity conduction blocks penetrating therethrough and insulated therefrom;
a pair of insulators stacked on outer sides of the first electrode and the second electrode and having through-holes formed therein, the through-holes having the electricity conduction blocks penetrating therethrough; and
a pair of electricity conduction plates stacked on outer sides of the pair of insulators to thereby be coupled to the electricity conduction blocks and electrically connected to the electricity conduction blocks.

3. The end cell heater for a fuel cell of claim 2, wherein the support has seating grooves concavely formed in both of the surfaces thereof, and the first electrode, the second electrode, the pair of insulators, and the pair of electricity conduction plates are seated in the seating grooves, wherein an outer surface of the support and outer surfaces of the electricity conduction plates are coplanar with each other.

4. The end cell heater for a fuel cell of claim 3, wherein fastening holes are formed in the electricity conduction blocks, and coupling holes corresponding to the fastening holes are formed in the electricity conduction plates, wherein the electricity conduction plates are coupled to the electricity conduction blocks by fastening means, and wherein the fastening means are formed not to protrude outwardly from the outer surfaces of the electricity conduction plates.

5. The end cell heater for a fuel cell of claim 2, wherein the insertion holes formed in the support are formed between the space parts in which the positive temperature coefficient elements are disposed.

6. The end cell heater for a fuel cell of claim 2, wherein the support has connector pins protruding from opposing side surfaces thereof, the connector pins electrically connected to the first electrode and the second electrode.

7. The end cell heater for a fuel cell of claim 6, wherein connection tabs are formed in the support and are electrically connected to the connector pins, and wherein the first electrode and the second electrode are stacked on and closely adhere to the top surface and a bottom surface of the support, respectively, wherein the connection tabs are electrically connected to the first electrode and the second electrode.

8. The end cell heater for a fuel cell of claim 7, wherein the support, the connector pins, and the connection tabs are formed integrally with one another.

9. A fuel cell comprising:
a fuel cell stack formed by stacking unit cells and having fuel channels and air channels each formed at opposing sides of a top surface thereof to penetrate therethrough in a stack direction; and
an end cell heater 1 coupled to the fuel cell stack and stacked on an outer side of a unit cell stacked at an outermost portion among the unit cells, the end cell heater including:
a support formed in a plate shape and having fuel channels and air channels each formed at opposing sides of a top surface thereof to penetrate through the support;

a heat generating part provided in the support and generating heat; and electricity conduction blocks coupled to the support to penetrate through both of the surfaces of the support, wherein the fuel channels of the end cell heater align with the fuel channels of the fuel cell stack and the air channels of the end cell heater align with the air channels of the fuel cell stack, wherein the support has space parts and insertion holes are formed therein to penetrate through the support, the heat generating part is disposed in the space parts, and the electricity conduction blocks are inserted into the insertion holes.

10. The fuel cell of claim 9, further comprising a bypass plate stacked on an outer side of the end cell heater, the bypass plate having fuel channels and air channels formed at opposing sides of a top surface thereof, wherein the fuel channels and the air channels of the bypass plate align with the fuel channels and the air channels of the end cell heater, respectively, and wherein the bypass plate is formed from an electrically conductive material.

11. The fuel cell of claim 10, further comprising:

an electrode plate stacked on an outer side of the bypass plate, the electrode plate having electrode terminals protruding outwardly therefrom, the electrode terminals formed from an electrically conductive material;

a cover coupled to the electrode plate and enclosing an outer side of the electrode plate, the cover formed to expose the electrode terminal to the outside thereof, and the cover formed from an electrical insulating material; and fastening members having opposing side surfaces coupled to the cover, wherein the fuel cell stack, the end cell heater, the bypass plate, the electrode plate, and the cover adhere to one another in the stack direction.

\* \* \* \* \*